United States Patent [19]

Ueyoko et al.

[11] Patent Number: 5,121,781
[45] Date of Patent: * Jun. 16, 1992

[54] HEAVY DUTY RADIAL TIRE

[75] Inventors: Kiyoshi Ueyoko, Osaka; Tsuneyuki Nakagawa, Kobe; Yasuyoshi Mizukoshi, Toyota, all of Japan

[73] Assignee: Sumitomo Rubber Industries, Ltd., Hyogo, Japan

[*] Notice: The portion of the term of this patent subsequent to Feb. 4, 2009 has been disclaimed.

[21] Appl. No.: 388,056

[22] Filed: Aug. 1, 1989

[30] Foreign Application Priority Data

Aug. 16, 1988 [JP] Japan .................. 63-204512
Aug. 16, 1988 [JP] Japan .................. 63-204513

[51] Int. Cl.$^5$ ............................................. B60C 15/02
[52] U.S. Cl. ................................. 152/539; 152/544; 152/552
[58] Field of Search ............... 152/539, 454, 527, 546, 152/541, 548, 556, 552, 451

[56] References Cited

U.S. PATENT DOCUMENTS

| | | | |
|---|---|---|---|
| 3,419,059 | 5/1965 | Bridge, Jr. ................... | 152/556 |
| 3,548,912 | 12/1970 | Rye ............................ | 152/543 X |
| 3,949,800 | 4/1976 | Lejeune ....................... | 152/541 X |
| 4,207,940 | 6/1980 | Roger . | |
| 4,342,353 | 8/1982 | Tamura et al. . | |
| 4,351,382 | 10/1982 | Corner et al. ................ | 152/544 X |
| 4,554,960 | 11/1985 | Pompier . | |
| 4,726,408 | 2/1988 | Alie et al. . | |
| 4,872,497 | 10/1989 | Harada et al. ................ | 152/541 |

FOREIGN PATENT DOCUMENTS

| | | | |
|---|---|---|---|
| 3346337 | 6/1985 | Fed. Rep. of Germany ...... | 152/451 |
| 1127632 | 12/1956 | France . | |
| 0050002 | 3/1985 | Japan .......................... | 152/556 |
| 0175510 | 7/1989 | Japan .......................... | 152/539 |

OTHER PUBLICATIONS

U.S. patent application Ser. No. 07/291,228, Heavy Duty Radial Tire; claims 6-9; Filing Date Dec. 28, 1988.

*Primary Examiner*—Michael W. Ball
*Assistant Examiner*—Nancy T. Krawczyk
*Attorney, Agent, or Firm*—Birch, Stewart, Kolasch & Birch

[57] ABSTRACT

A heavy duty radial tire and rim assembly exhibiting improved bead durability, wherein the bottom face of the bead is composed of an axially inner face Si and an axially outer face So each tapered axially inward to decrease the diameter of the bottom face, the taper in the inner face Si is greater than that of the outer face So, the boundary between the inner face Si and the outer face So is located axially inward of the center of gravity of the bead core, and in the condition that the tire is mounted on a regular rim and inflated to a regular pressure, the axial distance X of the axially inner edge Q2 of the bead core from a bead heal Q1 defined as an intersection between a rim base line B and an extending line of the inner surface of a rim flange of the rim is not less than 80% and not more than 105% of the height HR of the radially outer edge Q3 of the rim flange from the rim base line; and the radial distance Y of the radially outer edge Q4 of the bead core measured radially inwardly from the radially outer edge Q3 of the rim flange is not less than 0% and not more than 30% of the height HR of the rim flange from the rim base line.

11 Claims, 7 Drawing Sheets

HEAVY DUTY RADIAL TIRE

BACKGROUND OF THE INVENTION

The present invention relates to a heavy duty radial tire, and more particularly to a reinforcing structure suitable for airplane radial tires.

In radial ply tires used under severe conditions such as high internal pressure, heavy load and high speed, that is, in the heavy duty radial ply tires, a higher durability is required in comparison with other types of tires.

Particularly in the heavy duty radial ply tires for airplanes, the bead portion is apt to be broken starting from the turned up end of the carcass ply or in the vicinity thereof by the stress accompanying the bending deformation of the bead portion caused by heavy load at takeoff and landing.

Therefore, in order to reinforce the bead portions, increasing the hardness of the bead apex, increasing the volume of the bead apex, and adding a cord reinforcing layer have been mainly employed.

However, if these means are employed, it becomes difficult to keep the generated heat at a low level, to lower the repeating stress, and to prevent ply separation, which rather increases the occurrence of bead damage.

Moreover, when the tire is used at a high speed, for example over 300 km/h, a standing wave is apt to be generated, and if a standing wave is generated on the tire, it leads the bead portions to complicated deformation, and as a result, the durability of the bead portions is significantly lowered.

It is, therefore, an object of the present invention to provide a heavy duty radial tire improved in bead durability under very severe conditions.

SUMMARY OF THE INVENTION

According to one aspect of the present invention, a heavy duty radial tire comprises:

a pair of bead cores disposed one in each bead of the tire;

a carcass composed of at least one ply of organic fiber cords arranged radially at an angle of 90 to 75 degrees to the equatorial plane of the tire extending across the beads and turned up around the bead cores from the axially inside to the outside thereof to form two turned up portions and one toroidal main portion of the carcass;

an annular tread disposed radially outside the carcass; and a breaker composed of at least two plies of cords disposed between the tread and the carcass, wherein the bottom face of each bead is composed of an axially inner face Si and an axially outer face So, each tapered axially inward to decrease the diameter thereof, the taper in the inner face Si is greater than that of the outer face So, the boundary between the inner face Si and the outer face So is located axially inward of the center of gravity of the bead core, and in a condition that the tire is mounted on a regular rim and inflated to a regular pressure, the bead core in each bead is positioned to satisfy the following conditions:

the axial distance X of the axially inner edge Q2 of the bead core from a bead heal Q1 defined as an intersection between a rim base line B and an extending line of the inner surface of a rim flange of the rim is not less than 80% and not more than 105% of the height HR of the radially outer edge Q3 of the rim flange from the rim base line; and the radial distance Y of the radially outer edge Q4 of the bead core measured radially inwardly from the radially outer edge Q3 of the rim flange being not less than 0% and not more than 30% of the the height HR of the rim flange from the rim base line.

BRIEF DESCRIPTION OF THE DRAWINGS

The embodiment of the present invention will now be explained in detail by referring to the drawings, in which.

DETAILED DESCRIPTION OF THE INVENTION

Figure 1:
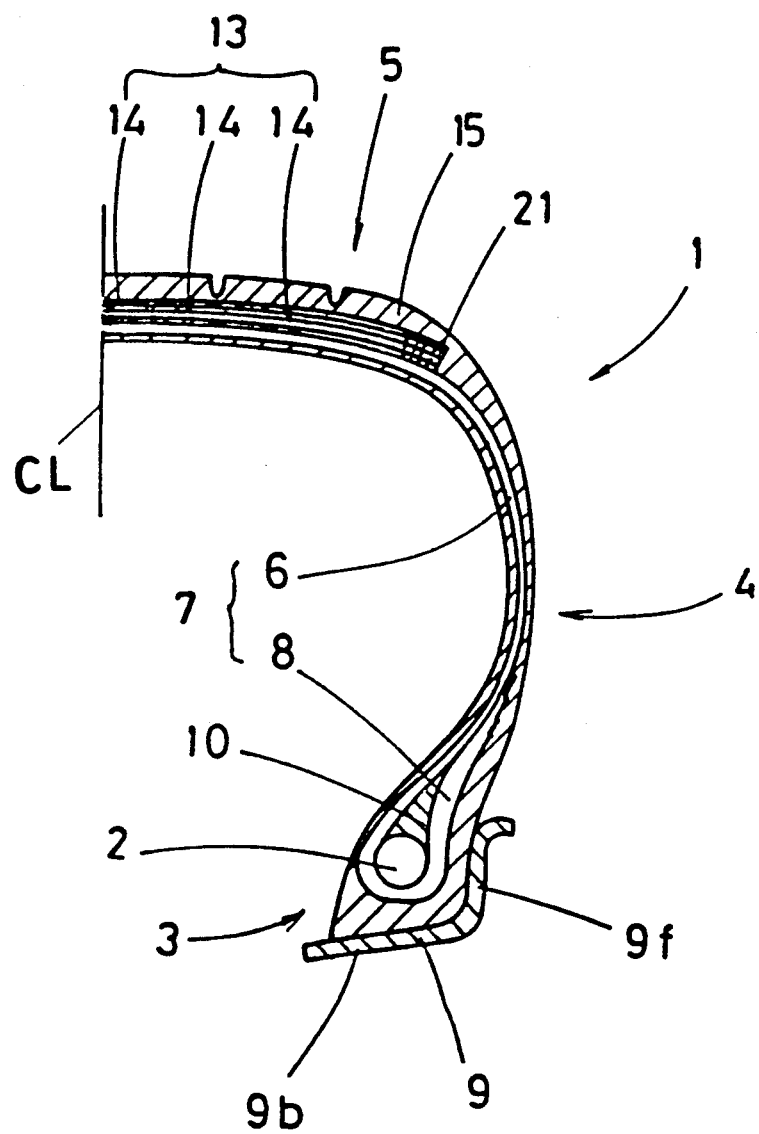
FIG. 1 is a sectional view showing an embodiment of the present invention.

In FIG. 1 which shows a right half of an airplane radial tire 1 according to the present invention, the tire 1 has a pair of bead portion portions 3, a pair of sidewall portions 4 and a tread portion 5, and the tire comprises a pair of bead cores 2 disposed one in each of the bead portions 3;

a carcass layer 7 extending across the bead portions and turned up around the bead cores from the axially inside to the outside thereof to form two carcass turned up portions 8 and a toroidal carcass main portion 6;

a pair of bead apexes 10 disposed one between the carcass main portion 6 and each of the carcass turned up portions 8; an annular rubber tread 15 disposed radially outside the carcass; and a breaker 13 disposed between the carcass and the tread.

The tire 1 is mounted on a standard rim 9 for the tire 1 and inflated to a regular inner pressure for the tire 1.

BREAKER

The breaker 13 is composed of at least two plies 14 of parallel breaker cords arranged at 0 to 30 degrees to the equatorial plane CL of the tire so that the at least two plies cross one another. In this embodiment, the breaker is composed of four plies of rubberized parallel organic fiber cords 21 arranged at 0 to 20 degrees with respect to the equatorial plane CL, which organic fiber cord has nearly the same characteristics as an organic fiber cord used for the carcass.

BEAD CORE

Figure 2:
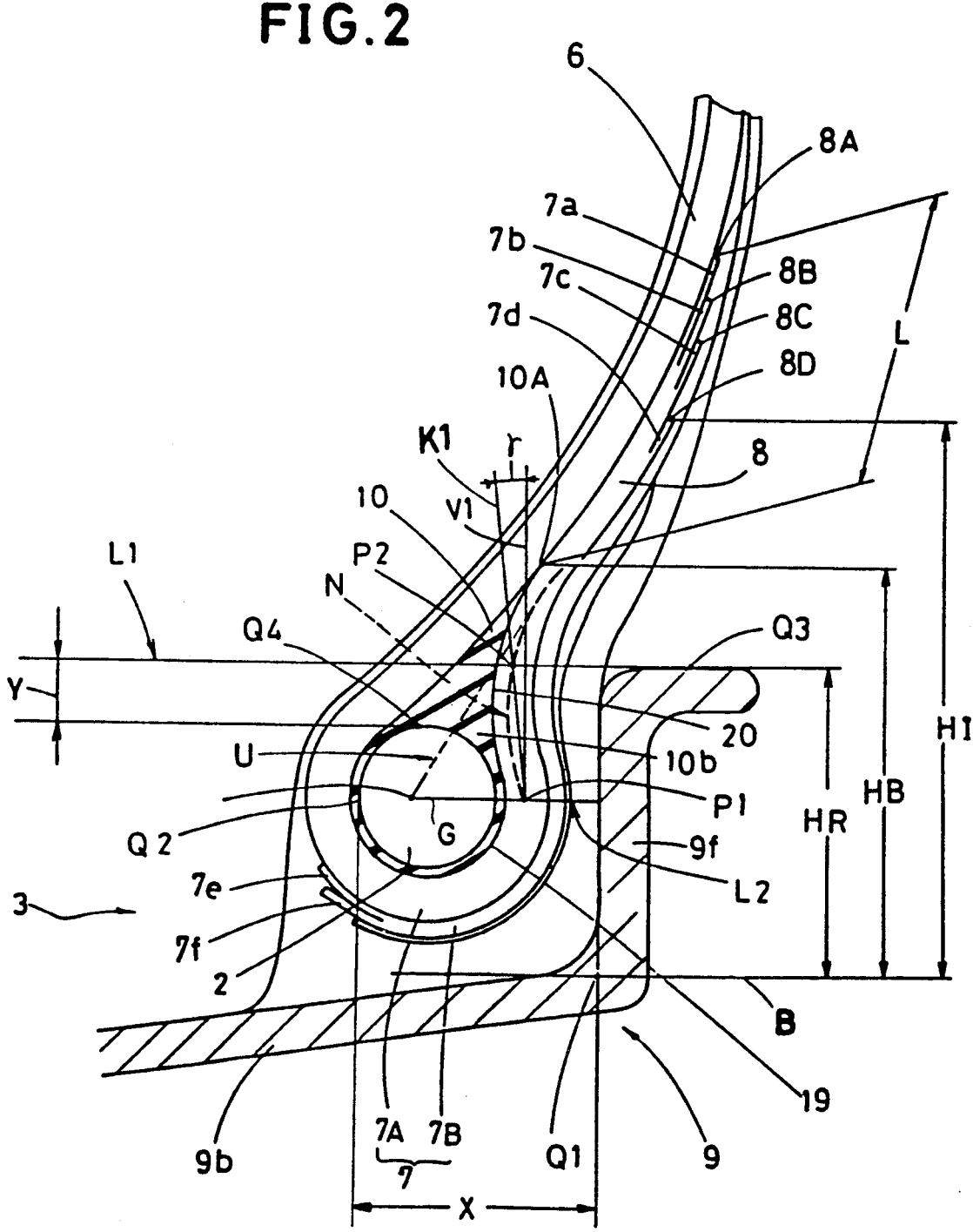
FIG. 2 is a detailed view of a bead thereof in a state of being mounted on a regular rim and inflated to a regular pressure, but not under load.

The bead core 2 in this embodiment has a circular sectional shape as shown in FIG. 2, and its position is defined relative to the rim 9 as follows:

the ratio X/HR of the axial distance X between a bead heel point Q1 and the axially inner end Q2 of the bead core 2 to the height HR of a rim flange 9f is set to be not less than 0.8 and not more than 1.05, wherein the bead heel point Q1 is an intersection of a bead base line, that is, a rim base line B with an extending line of the inner surface of the rim flange 9f, and the height HR of the rim flange 9f is the radial distance between the rim base line B and the upper edge Q3 of the rim flange 9f;

the radially outer edge Q4 of the bead core is located radially inside the upper end Q3 of the rim flange 9f; and the ratio Y/HR of the radial distance Y measured inwardly from Q3 to Q4 to the height HR of the rim flange 9f is set to be not less than 0 and not more than 0.3.

As to the sectional shape of the bead core 2, it can be formed in a hexagonal shape and a rectangular shape in addition to the circular sectional shape.

BEAD APEX

The above-mentioned bead apex 10 is made of a relatively hard rubber having a triangular section, and it fills between the carcass main portion 6 and the carcass turned up portion 8.

The bead apex rubber has a JIS A hardness of 65 to 90.

The bead apex 10 extends radially outwardly and taperingly from the bead core 2 over the rim flange 9f. That is, the height HB of the radially outer edge 10A thereof is larger than the height HR of the rim flange.

Figure 8:
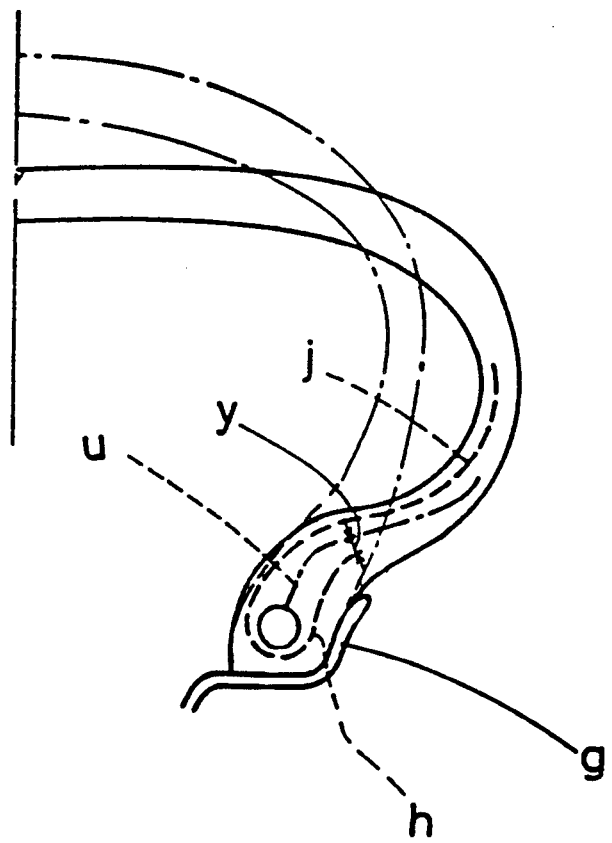
FIG. 8 is a sketch showing deformation of a tire.

On the other hand, if a heavy duty radial tire is largely deformed during running as shown in FIG. 8, a part of the bead portion radially outward of the upper edge of the rim flange is repeatedly subjected to large outward bending deformation, which generates heat in that portion, and the heat generation is greatest at a hard rubber bead apex. It is therefore possible to reduce the deformation of the bead apex, that is, the heat generation, by reducing the thickness thereof and preliminarily forming it in a shape close to the deformed shape under load.

Further, if the relative positions of the bead core 2 to the rim 9 are given, the approximate form of the base part 10b of the bead apex 10, where deformation and heat due to load create problems, is determined.

By setting the above-mentioned ratios X/HR and Y/HR in the ranges as stated above, the bead apex 10 can be preliminarily formed closer to a loaded shape, whereby the deformation can be lessened and heat generation can be prevented.

As explained above, the ratio X/HR should be not less than 0.80 and more preferably not less than 0.85. If it is less than 0.80, the deformation and heat cannot be inhibited. When the ratio X/HR becomes larger than 1.05, the volume of the bead portion 3 becomes excessively large and the bead core 2 departs from the rim flange 9f too far so as to bring about adverse effects to the durability and the bead seating and its production becomes difficult. The ratio X/HR is preferably not more than 1.0.

Further, if the ratio Y/HR exceeds 0.30, it becomes difficult to achieve the object of the present invention. If it is less than 0, that is, the outer edge Q4 of the bead core 2 is located radially outside the outer edge Q3 of the rim flange, the bending of the carcass 7 is concentrated on the outer edge Q4 of the bead core 2, which leads to the breakage of the carcass 7 itself.

Figure 4:
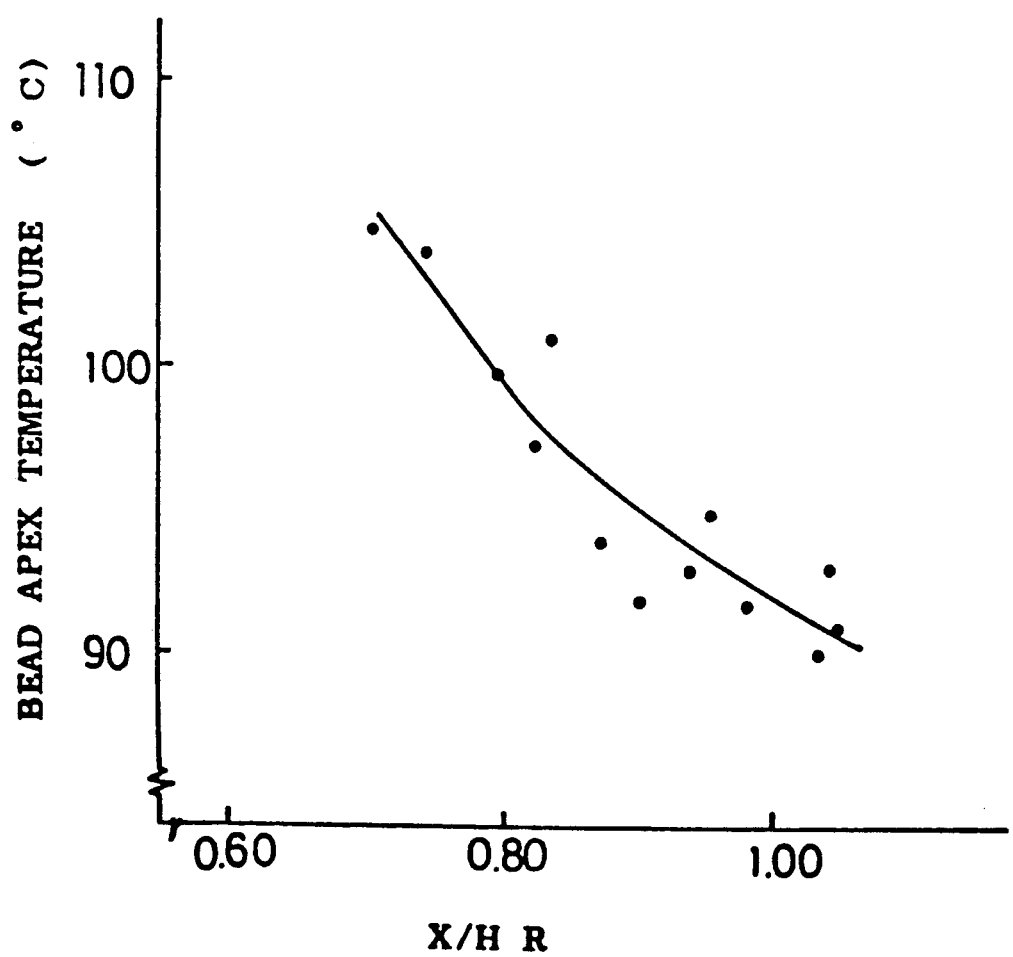
FIG. 4 is a graph showing the relationship between bead temperature and bead core position.
Figure 5:
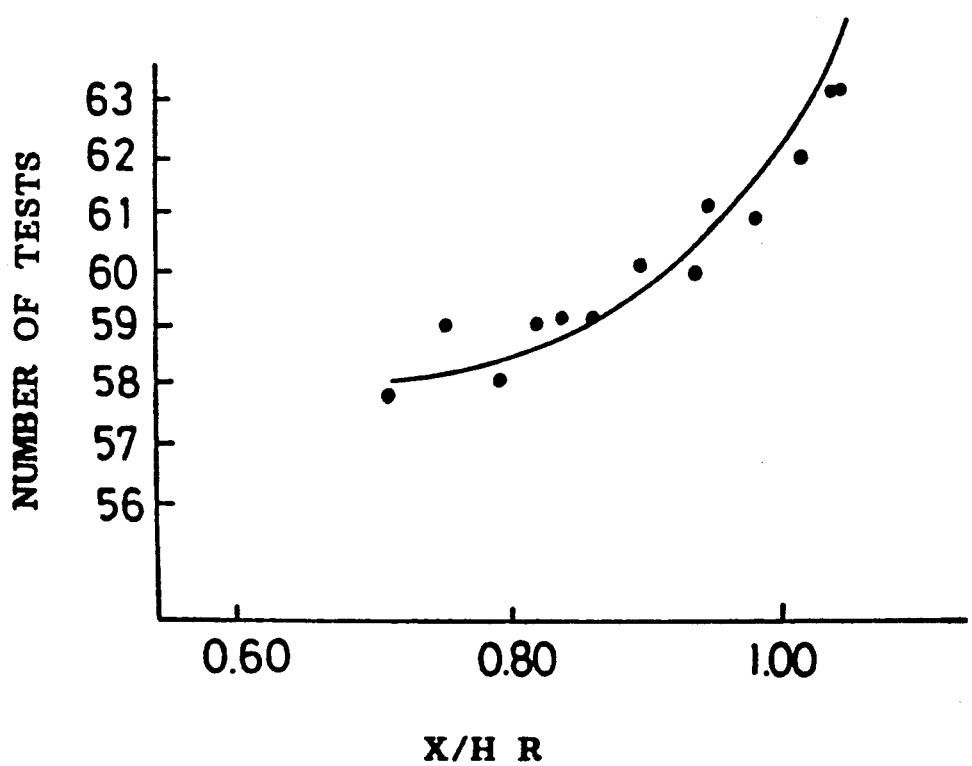
FIG. 5 is a graph showing the relationship between tire durability and bead core position.

FIG. 4 and FIG. 5 show the results of repeating acceleration tests using an indoor bench testing machine. For the tests, modifying the above value X, several types of 46×17 R20 tires for airplane were produced. Each test tire was mounted on a standard rim of size 49×17 and inflated to 14.8 kg/sq.cm, and then repeatedly subjected to such an acceleration test that the running speed increased from 0 to 363 km/h for a period of 55 seconds under a load of 21 tons.

In the graph of FIG. 4, the abscissa denotes the ratio X/HR, and the ordinate indicates the temperature in the bead apex measured immediately after the tire was subjected to the acceleration test ten times. This graph shows that the temperature of the bead apex decreases according to the increase of the ratio X/HR and that the temperature of the bead apex reaches up to 100 degs.C. when the ratio X/HR becomes less than 0.80.

In the graph of FIG. 5, the abscissa expresses the ratio X/HR, and the ordinate indicates the number of times of the acceleration tests until a damage was generated on the bead on the test tires.

It was found out that, along with the increase of X/HR, the number of test times were raised, and the durability at the bead was improved.

Through the production of the test tires, it was also found out that tires in which X/HR exceeds 1.05 are difficult to produce, and that the bead seating on rim base in such tires is so bad that it is impossible to subject the tire and rim assembly to the test.

It was also clarified in a similar way that it is preferable for the ratio Y/HR to be set in the above-mentioned range from 0 to 0.3.

BEAD PROFILE

Figure 3:
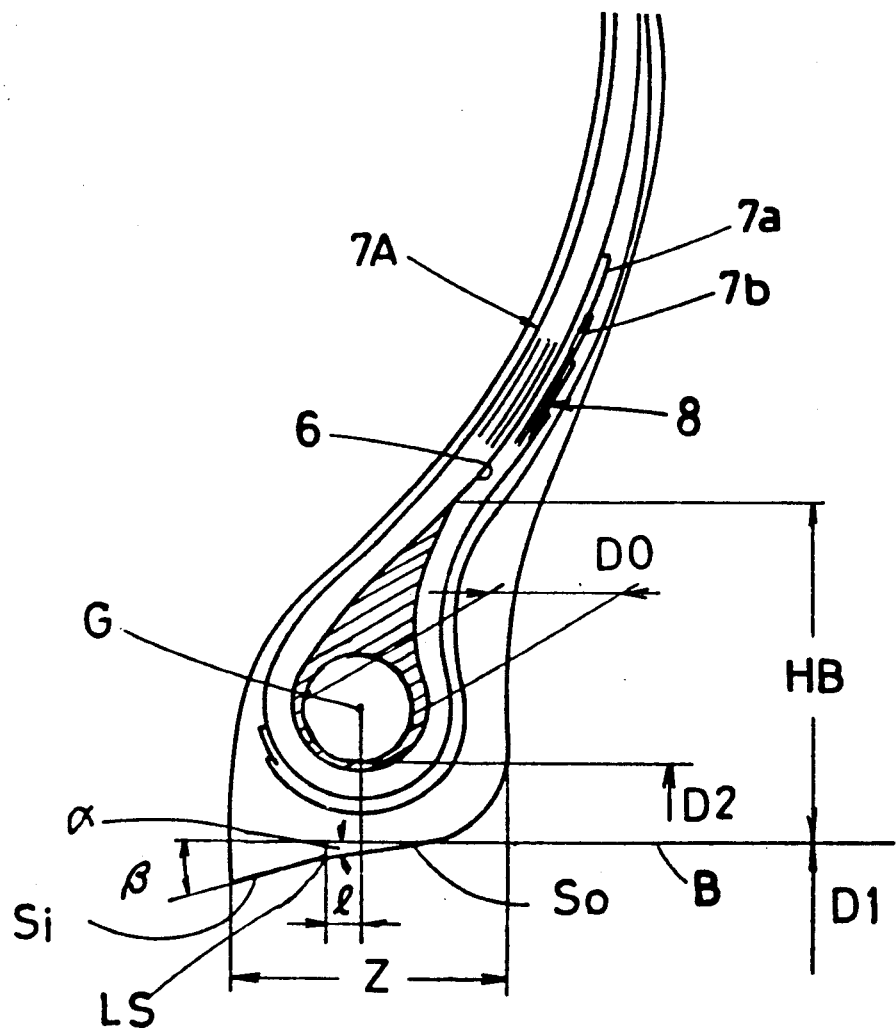
FIG. 3 is a sectional view of the bead in a free state of not being mounted on any rim.

The bottom face of the bead portion 3 is formed in a double taper shape as shown in FIG. 3, although the bead seat on the rim base 9b of the rim 9 is formed in a single taper shape as shown in FIG. 2. That is, in a state that the tire is not mounted on any rim, the bottom face comprises two inclined faces Si and So.

The axially inner face Si and the axially outer face So are inclined radially inwardly toward the axially inside so as to decrease the diameter.

With respect to the axis of the tire, the inclination angle (beta) of the inner face Si is larger than the inclination angle (alpha) of the outer face So which is designed according to the inclination angle of the bead seat of the rim.

Further, the intersection LS between the inner and outer faces Si, So is located inside the center of gravity G of the bead core 2 in the axial direction of the tire, and the distance l is preferably in a range from 10 to 30% of the sectional diameter D0 of the bead core.

The bead bottom face formed in such a double taper shape helps to increase the critical speed of the standing wave generation.

The radial tires for heavy load and high speed, especially those for airplanes, should be designed to endure a large radial deflection under load, for example, 28 to 40% in order to alleviate shocks at takeoff and landing. Under such conditions, if the running speed is increased over the critical speed of standing wave, standing wave will be easily generated.

And if standing wave is generated, the durability is easily lost not only in the tread portion but also in the bead portions. Accordingly, it is very important for this type of tires to effectively suppress the generation of standing wave. Here, the critical speed is given by the following well known equation, $$Vc = \sqrt{\frac{T}{m} + 2\sqrt{\frac{EI \cdot K}{m}}}$$

where
Vc: critical speed of standing wave generation,
m: mass of tread per unit length,
EI: inner flexual rigidity of the tire on the tread,
T: belt tensile force, and
K: spring constant of the carcass.

This equation shows that, in order to raise the critical speed Vc of standing wave generation, it is enough to increase the belt tensile force T and the spring constant K of the carcass.

On the other hand, in a tire vulcanizing process, the inside of the raw tire (green cover) is pressurized strongly, and a tensile force is generated in the carcass ply. Accordingly, if the bead cores are shifted by the tensile force with decreasing the tension of the carcass cords, the spring constant of the carcass is lowered. As a result, the critical speed Vc is also lowered.

Thus, in order to heighten the speed Vc, it is preferable to increase the value of the spring constant K by setting the length of the carcass between the bead cores 2 smaller in the state of green cover before vulcanization than that in the state of finished tire after the vulcanization to further increase the tensile force applied to the carcass cords through the vulcanizing process.

However, if this method is employed, due to the increased tensile force of the carcass cords, the bead core is more easily shifted axially outwardly, and the above-mentioned axial distance X becomes short. Incidentally, it becomes difficult to set the ratio X/HR in the above-mentioned range of 0.80 to 1.05, if the amount of the shift is excessively large.

By forming the bead bottom face in a double taper shape, the bead core is prevented from axially outward shifting which changes the ratios X/HR and Y/HR. Therefore, the tensile force T of the belt and the spring constant K of the carcass are increased, and the critical speed of standing waves is upraised, thereby improving the bead durability.

Further, in such tires where the bead cores are shifted axially outwardly as explained above, after the tire has been repeatedly subjected to large deflections under a heavy load and high speed condition, it was sometimes observed that the bead portion was permanently deformed in a toe portion such that the bottom surface of the toe portion inclined radially outwardly, which worsens the bead seating. By forming the bead bottom face in a double taper shape, this problem can be also solved.

Therefore, the tire 1 is produced by using the above method to prevent the generation of standing wave, and the bottom face of each bead thereof is formed in the double tapered shape as stated above by so designing the tire mold.

Besides, as shown in FIG. 3, the ratio Z/HR of the base width Z of the bead to the rim flange height HR is preferably set in a range from 1.05 to 1.50.

When the ratio Z/HR is smaller than 1.05, the ratio X/HR is hard to establish at a value of not less than 0.80, or when Z/HR is larger than 1.50, the volume of the bead becomes so large as to increase the amount of the generated heat.

Further, from the viewpoint of the stability and durability of the bead and the rim composition, it is preferable to satisfy the following conditions:
$1.03 \leq D1/D2 \leq 1.06$
$1.50 \leq X/D0 \leq 2.00$
$0.37 \leq D0/Z \leq 0.45$
where
D1 is the diameter at the bead base line B,
D2 is the inner diameter of the bead core, and
D0 is the cross section diameter of the bead core.

The bead portion in this embodiment is, furthermore, provided with a thin hard rubber bead filler 19 between the inner surface of the carcass and the bead core to prevent abrasion of the carcass which is moved around the bead core like a belt on a pulley by repeated deformations of the tire.

CARCASS

The carcass 7 in this embodiment comprises an inner carcass ply layer 7A turned up around the bead core from the inner side to the outer side of the tire, and an outer carcass ply layer 7B turned up around the bead core from the outer side to the inner side of the tire so as to cover the outside of the turned up portion of the inner layer 7A. The inner layer 7A is composed of a plurality of plies of organic fiber cords, in this example, 4 plies 7a, 7b, 7c, and 7d, and the outer layer 7B is also composed of a plurality of plies of organic fiber cords, in this example, two plies 7e, 7f.

The carcass cords are laid radially at 75 to 90 degrees to the equator of the tire, and the carcass plies are alternately inclined with respect to the radial direction of the tire so that each ply crosses the next ply.

The innermost carcass ply 7a with respect to the center of the bead core, that is, the carcass ply adjacent to the bead core 2 contacts directly with the carcass main portion 6 in a certain range L from the radially outer end 8A, and the radially outer ends 8B, 8C, 8D of the remaining carcass plies 7b, 7c, 7d in the inner layer 7A are terminated in this contacting region L as shown in FIG. 2.

The width of the contacting region L in the radial direction of the tire is 10 to 20% of the section height of the tire from bead base line B.

When the bead receives a bending deformation as shown in FIG. 8, a tensile stress is generated inward thereof, and a compressive stress is generated outward thereof, and accordingly a neutral line u exists therebetween. On the radially outside of the rim flange g, this neutral line u is formed near the carcass main portion j, and a compressive stress is applied to the upper end of the turned up portion h of the carcass ply, which leads to breakage, and this stress is in proportion to the distance y to the neutral line u.

Consequently, by disposing the radially outer ends 8A to 8D of the carcass plies in the contacting region L, the stress added thereto is effectively minimized.

The heights of the carcass plies 7a, 7b, 7c and 7d are arranged so that the axially outer the position, the lower the height. And the height HI of the lowest end 8D of the carcass ply 7d is set larger than the height HB of the tip 10A of the bead apex 10, and the height of the highest end 8A of the innermost carcass ply 7a is set smaller than 50% of the section height of the tire from the bead base.

Accordingly, the height HB of the bead apex 10 is set higher than the height HR of the rim flange and lower than the height HI of the lowest turned up portion of the carcass ply.

On the other hand, the plies 7e, 7f of the outer layer 7B are terminated radially inward of the bead core.

In this way, by forming the turned up portion 8 of the carcass in the structure stated above, and defining the height of the bead apex 10, the strain produced by the deformation on the turned up portion 8 can be minimized and the separation generated from the edge of the turned up portion 8 can be prevented.

In addition, by extending along the curvature 20 provided on the axially outside of the bead apex 10, the turned up portion 8 of the carcass is curved axially inwardly such that the mid-thickness line N of the carcass turned up portion passes through axially inside a straight line P1-P2 drawn between two points P1 and P2, wherein the point P1 is an intersection between the mid-thickness line N and a straight line L2 drawn from the center of gravity G of the bead core in parallel to the axial direction of the tire, and the point P2 is an intersection between a straight line L1 drawn in parallel to the axial direction of the tire from the upper edge Q3 of the rim flange 9f and a straight line K1 drawn from the point P1 with inclining axially inwardly at an angle (gamma) of 0 to 20 degrees with respect to the radial line V1. In this embodiment, the line N passes through the point P2.

As a consequence, the distance of the turned up portion 8 of the carcass 7 from the stress neutral line U is decreased in the range between the points P1 and P2, and this decrease leads to a decrease in the stress, especially the compressive stress generated on the outer carcass plies by the deformation of the carcass, thereby improving the resistance against fatigue of the carcass. Further, the curved shape of the turned up portion is similar to that when deflected, which can also decrease the stress.

PLY CORD

Figure 6:
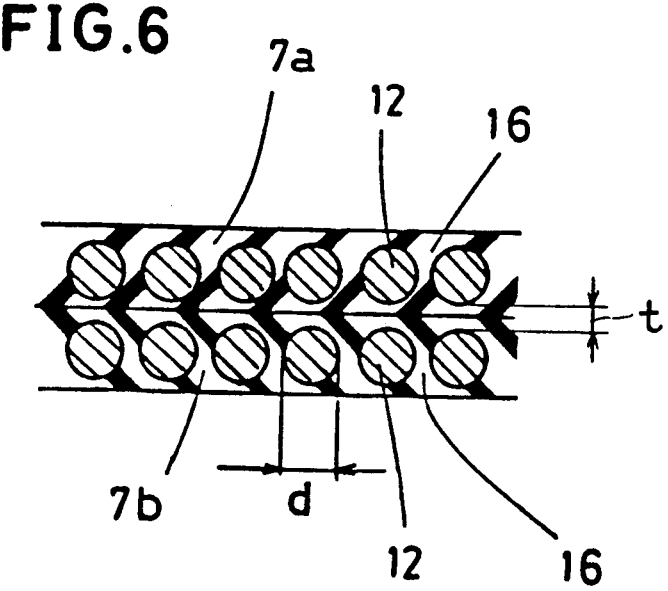
FIG. 6 is an enlarged sectional view showing a carcass ply.

The carcass plies are composed of organic fiber cords 12 embedded in a rubber 16 as shown in FIG. 6.

Figure 7:
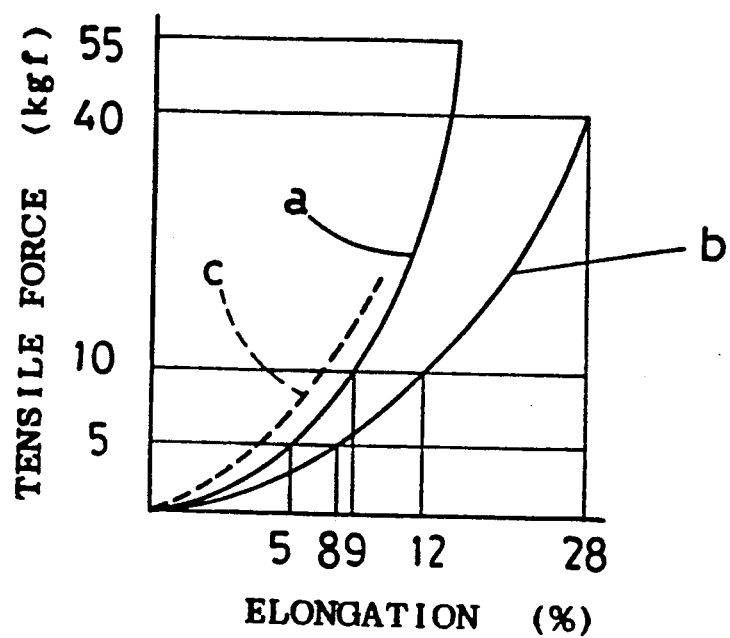
FIG. 7 is a graph showing the characteristic of an organic fiber cord for the carcass cord.

The organic fiber cord 12 has such elastic characteristics that the elongation thereof when loaded by 5 kgf is 5 to 8%, the elongation thereof when loaded by 10 kgf is 9 to 12%, and the strength thereof is 140 to 170 kgf/sq.mm. In FIG. 7, such organic fiber cord is sandwiched between lines a and b. Incidentally, the breaking load of the cord which shows the line a was about 55 kgf, and that of the cord which shows the line b was about 40 kgf.

The organic fiber cord has such a characteristic that the elongation rate becomes small as the load increases as shown typically by the curved line a and b in FIG. 7, and the elongation at breakage is set at not more than 28%.

As known from the values above, the organic fiber cord gives an elongation of 10 to 11% in a range between 16% and 25% of its cord strength.

A conventional carcass cord shown by line c in FIG. 7 has a large starting angle and a rectilinearity in comparison with the curve a.

For the organic fiber cord, nylon, polyester, aliphatic polyamide, carbon and metals can be used, but among them, an aliphatic polyamide fiber cord is preferably used because it can satisfy the above characteristics most sufficiently.

Besides, the above-mentioned characteristics can be obtained by reducing the tension in the so-called dip stretch, a process in which tension and heat are applied to the cord for a specific period of time, widely from the usual tension.

The use of such cord makes it possible to give an elongation of not less than 6%, more preferable 8 to 9% to the carcass cords in a state that the tire is inflated to a rated pressure. In this way by preliminarily giving a larger elongation than usual to the carcass cords, the compressive stress due to the bending of the bead at takeoff and landing is effectively reduced, and the carcass can be prevented from local deformations and foldings, and breakages due to the fatigue caused by the compressive strain. In addition, the compressive stress of the bead rubber itself can be alleviated, which also improves the durability of the bead.

Meanwhile, the thickness d of the organic fiber cord 12 is set relatively small and is not more than 1.2 mm.

For the topping rubber for the carcass ply, a high modulus rubber compound with a superior durability is used. The JIS A hardness thereof is 60 to 90, the 100% modulus thereof is 30 to 100 kfg/sq.cm, the strength thereof is 150 to 300 kgf/sq.cm, and the elongation at breakage is 300 to 600%.

The thickness t of the coating rubber layer 16 is set at not more than 0.8 mm as shown in FIG. 6.

Because of the higher modulus, the carcass plies in the bead region, which form a strong triangular construction by the turned up portions and under main portions thereof, can lessen the deformation of bead under load, and the large elongation at breakage leads to the increase of durability of the bead. The coating of the organic fiber cord 12 with such a rubber realizes an easy extension of organic fiber cord 12 and additional extension at the bead 3 in vulcanization.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A tire and rim assembly comprising a radial tire and a rim on which said tire is mounted,
    said tire comprising
        a pair of bead portions with a core,
        a tread portion,
        a pair of sidewall portions extending between the tread edges and the bead portions,
        a carcass composed of at least one ply of organic fiber cords arranged radially at an angle of 90 to 75 degrees to the equatorial plane of the tire extending across the bead portions and turned up around the bead cores from the axially inside to the outside thereof to form two turned up portions and one toroidal main portion of the carcass,
        an annular tread disposed radially outside the carcass to define said tread portion, and
        a breaker composed of at least two plies of cords disposed between the tread and the carcass, said rim comprising
- a bead seat on which each bead portion of the tire is seated, and
- a flange extending radially outwardly from the axially outer edge of said bead seat, wherein in the condition where the tire is not mounted on the rim, each of said bead portions is provided with a bottom face composed of an axial inner face and an axial outer face, each tapered axially inward to decrease the diameter of the bottom face, the taper angle (beta) of said inner face being larger than the taper angle (alpha) of said outer face, said angle (alpha) corresponding to the inclination angle of the bead seat of the rim, and the boundary between the inner face and the outer face is located axially inward of the center of gravity of the bead core, and wherein in a condition where the tire is mounted on said rim and inflated to normal tire pressure, the bead core in each bead portion is positioned to satisfy the following conditions:

the axial distance (X) from the axially inner edge (Q2) of the bead core to the bead heel (Q1), defined as the intersection between a base line (B) of the rim and an extended line of the inner surface of the rim flange, is not less than 80% and not more than 105% of the height (HR) of the radial outer edge (Q3) of the rim flange from the base line; and the radial distance (Y) from the radially outer edge (Q4) to the bead core measured radially inwardly from the radially outer edge (Q3) of the rim flange is not less than 0% and not more than 30% of the height (HR) of the rim flange from the base line.

2. The assembly according to claim 1, wherein said at least one carcass ply contacts directly with the carcass main portion in a certain range of which width in the radial direction of the tire is 10 to 20% of the section height of the tire.

3. The assembly according to claim 1, wherein said carcass is composed of a plurality of plies, and
- the carcass ply adjacent to the bead core contacts directly with the carcass main portion in a range in which the width in the radial direction of the tire is 10 to 20% of the sectional height of the tire, and
- the remaining at least one carcass ply has a turned up portion terminated in said range, and
- the highest carcass ply, turned up portion has a radial outer edge located radially inward of the half of the tire section height, and
- each bead portion is provided with a bead apex disposed between the main portion and the turned up portion of the carcass, and
- the radially outer edge of said bead apex is extended radially outwardly from the bead core over the radially outer edge of the rim flange, but not over the radially outer edge of the lowest carcass ply, turned up portion.

4. The assembly according to claim 2, wherein each carcass cord has elastic characteristics such that the elongation under a 5 kgf load is 5 to 8%, the elongation under a 10 kgf load is 9 to 12%, and the elongation at breakage is not more than 28%.

5. The assembly according to claim 3, wherein each carcass cord has elastic characteristics such that the elongation under a 5 kgf load is 5 to 8%, the elongation under a 10 kgf load is 9 to 12%, and the elongation at breakage is not more than 28%.

6. The assembly according to claim 4, wherein said carcass cord is made of an aliphatic polyamide.

7. The assembly according to claim 5, wherein said carcass cord is made of an aliphatic polyamide.

8. The assembly according to claim 4, wherein the carcass ply cords are embedded in rubber having a 100% modulus of 30 to 100 kgf/sq.cm.

9. The assembly according to claim 5, wherein the carcass ply cords are embedded in rubber having a 100% modulus of 30 to 100 kgf/sq.cm.

10. The assembly according to claim 4, wherein the thickness of each carcass cord is not more than 1.2 mm.

11. The assembly according to claim 1, wherein the turned up portion of the carcass is curved axially inwardly such that the mid-thickness line (N) of the carcass turned up portion passes axially inside a straight line (P1-P2) drawn between two points (P1 and P2), wherein
- one point (P1) is the intersection between the mid-thickness line (N) and a straight line (L2) drawn from the center of gravity (G) of the bead core in parallel to the axial direction of the tire, and
- the other point (P2) is the intersection between a straight line (L1) drawn in parallel to the axial direction of the tire from the upper edge (Q3) of the rim flange and a straight line (K1) drawn from the point (P1) and inclining axially inwardly, at an angle (gamma) of 0 to 20 degrees with respect to a radial line (V1) passing through the one point (P1).

* * * * *